US008918876B2

(12) United States Patent
Larsson et al.

(10) Patent No.: US 8,918,876 B2
(45) Date of Patent: Dec. 23, 2014

(54) DEVIATING BEHAVIOUR OF A USER TERMINAL

(75) Inventors: Tony Larsson, Upplands Vasby (SE); Mattias Lidstrom, Stockholm (DE); Martin Svensson, Hagersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 253 days.

(21) Appl. No.: 13/266,790

(22) PCT Filed: Apr. 30, 2009

(86) PCT No.: PCT/SE2009/050471
§ 371 (c)(1),
(2), (4) Date: Oct. 28, 2011

(87) PCT Pub. No.: WO2010/126416
PCT Pub. Date: Nov. 4, 2010

(65) Prior Publication Data
US 2012/0060219 A1 Mar. 8, 2012

(51) Int. Cl.
*G06F 11/30* (2006.01)
*G08B 23/00* (2006.01)
(Continued)

(52) U.S. Cl.
CPC ............. *H04W 12/12* (2013.01); *H04M 15/47* (2013.01); *H04M 1/56* (2013.01); *H04L 43/06* (2013.01); *G06F 21/552* (2013.01); *H04M 3/2218* (2013.01); *H04L 63/1425* (2013.01); *H04L 43/026* (2013.01); *G06F 21/554* (2013.01); *H04L 63/104* (2013.01); *H04L 63/1416* (2013.01); *H04W 12/08* (2013.01)
USPC ........................................................ 726/23

(58) Field of Classification Search
CPC .. H04W 12/12; H04W 12/08; H04L 63/1416; H04L 43/06; H04L 43/026; H04L 43/104; H04L 63/1425; G06F 21/552; G06F 21/554; H04M 15/47; H04M 1/56; H04M 2203/6027; H04M 2215/0148; H04M 3/2218
USPC ................................................ 726/23, 22, 24–25
See application file for complete search history.

(56) References Cited

U.S. PATENT DOCUMENTS 5,822,691 A * 10/1998 Hosseini ........................ 455/410
6,035,043 A * 3/2000 Sansone et al. ............... 380/250
(Continued)

FOREIGN PATENT DOCUMENTS

| EP | 805610 A2 * | 11/1997 | ............... H04Q 7/38 |
| EP | 0985995 A1 | 3/2000 | |
| WO | 0131420 A2 | 5/2001 | |

OTHER PUBLICATIONS

Fink, Glenn A. et al. "Visual Correlation of Host Processes and Network Traffic", 2005.*
(Continued)

*Primary Examiner* — Michael Simitoski
(74) *Attorney, Agent, or Firm* — Rothwell, Figg, Ernst & Manbeck, P.C.

(57) ABSTRACT

The invention relates to a method, device (24) in a network node of a communication network (N) and computer program products for determining deviating behavior of a user terminal (10). According to the invention the device (24) obtains a first group of event data sets (EDS1) and a second group of event data sets (EDS2, EDS4), where each group includes at least one event data set. Each event data set in the first group includes user terminal generated event data related to events in a specific user terminal (10) and each event data set in the second group includes network generated event data related to the specific user terminal. The device then performs a comparison involving the first group of event data sets and the second group of event data sets and determines the existence of deviating behavior of the user terminal based on the comparison.

24 Claims, 7 Drawing Sheets

(51) Int. Cl.
*H04W 12/12* (2009.01)
*H04M 15/00* (2006.01)
*H04M 1/56* (2006.01)
*H04L 12/26* (2006.01)
*G06F 21/55* (2013.01)
*H04M 3/22* (2006.01)
*H04L 29/06* (2006.01)
*G06F 12/14* (2006.01)
*H04W 12/08* (2009.01)

(56) References Cited

U.S. PATENT DOCUMENTS

| | | | | |
|---|---|---|---|---|
| 6,295,446 | B1* | 9/2001 | Rocha | 455/410 |
| 7,376,969 | B1* | 5/2008 | Njemanze et al. | 726/22 |
| 7,712,132 | B1* | 5/2010 | Ogilvie | 726/22 |
| 7,962,121 | B2* | 6/2011 | Vialen et al. | 455/410 |
| 8,528,077 | B1* | 9/2013 | Tidwell et al. | 726/22 |
| 2003/0037138 | A1* | 2/2003 | Brown et al. | 709/225 |
| 2003/0101357 | A1* | 5/2003 | Ronen et al. | 713/201 |
| 2003/0110385 | A1* | 6/2003 | Golobrodsky et al. | 713/188 |
| 2004/0117478 | A1* | 6/2004 | Triulzi et al. | 709/224 |
| 2004/0199828 | A1 | 10/2004 | Cabezas et al. | |
| 2005/0086529 | A1 | 4/2005 | Buchsbaum | |
| 2006/0224930 | A1* | 10/2006 | Bantz et al. | 714/48 |
| 2006/0236395 | A1 | 10/2006 | Barker et al. | |
| 2006/0288261 | A1 | 12/2006 | Yuan et al. | |
| 2007/0300061 | A1* | 12/2007 | Kim et al. | 713/164 |
| 2009/0292924 | A1* | 11/2009 | Johnson et al. | 713/176 |
| 2010/0107257 | A1* | 4/2010 | Ollmann | 726/24 |

OTHER PUBLICATIONS

Hilas, Constantinos S. and John N. Sahalos. "User Profiling for Fraud Detection in Telecommunication Networks", 2005.*

Smith, Robert N. and Sourav Bhattacharya. "Operating Firewalls Outside the LAN Perimeter", 1999.*

* cited by examiner

T1

| EDS | ID | S_ADR | P | D_ADR | P | C | T | S |
|---|---|---|---|---|---|---|---|---|
| EDS2 | UT1 | ADR1 | P1 | ADR2 | P2 | C1 | T1-T2 | S1 |
| EDS3 | UT2 | ADR3 | P1 | ADR4 | P2 | C1 | T1-T2 | S2 |
| EDS4 | UT1 | ADR1 | P2 | ADR2 | P1 | C2 | T3-T4 | S1 |

| EDS | ID | S_ADR | P | D_ADR | P | C | T | S |
|---|---|---|---|---|---|---|---|---|
| EDS1 | UT1 | ADR1 | P1 | ADR2 | P2 | C1 | T1-T4 | S1 |
| EDS6 | UT1 | ADR1 | P1 | ADR2 | P2 | C1 | T5-T6 | S1 |
| EDS7 | UT1 | ADR5 | P5 | ADR1 | P1 | C2 | T7-T8 | S2 |

FIG. 5

```
<DEVIATING BEHAVIOUR DETERMINING FUNCTION>
    INSTR
    INSTR
</DEVIATING BEHAVIOUR DETERMINING FUNCTION>
<EDS CORRELATING FUNCTION>
    INSTR
    INSTR
</EDS CORRELATING FUNCTION>
```

FIG. 11

DEVIATING BEHAVIOUR OF A USER TERMINAL

CROSS-REFERENCE TO RELATED APPLICATION

This application is a 35 U.S.C. §371 National Phase Entry Application from PCT/SE2009/050471, filed Apr. 30, 2009, and designating the United States.

TECHNICAL FIELD

The invention relates to determining deviating behaviour of a user terminal. More particularly, the invention relates to a method, device and computer program products for determining deviating behaviour of a user terminal.

BACKGROUND

In telecommunication networks today user terminal capabilities are becoming increasingly available for $3^{rd}$ party service providers. Both user terminal manufacturers and network operators have thus opened up their APIs (Application Program Interface) for such other developers to use. By exposing functionalities for service providers possibilities to develop services enhanced with basic telecommunication functionalities such as telephony and messaging increases. The number and variety of various types of $3^{rd}$ party applications that can be provided in relation to user terminals and communication networks have therefore increased considerably.

However, this does not only introduce new experiences to a user. By introducing new possibilities for service providers one does not only enable creation of enhanced services but the user terminal is also subjected to risks. These risks include deviating behaviour like the risk for software that acts maliciously (either intentionally or by mistake). There is no good way of controlling that new services developed behave as promised, i.e. that events occurring in the user terminal are expected, without extensive testing. Such testing is the traditional solution to the problem and includes certification of applications. In the new environment certification is difficult since services can build on each other and use components developed by separate entities. Testing should furthermore be made before an end user, like a consumer, uses the end terminal.

Another existing way to control $3^{rd}$ party applications in the user terminal environment is to use "sandbox"-solutions, i.e. solutions where the $3^{rd}$ party applications are only allowed to be executed within a "sandbox" with very limited access to the user terminal capabilities. These types of solutions do however create so many limitations and restrictions that they limit the creativity of the software developers. This does in fact not identify a user terminal having a deviating behaviour, but instead limits the probability of deviating behaviour through limiting the capabilities of applications.

Firewall technology is another important technology used to grant or block access for certain applications. Firewalls exist both as personal firewalls that can be installed on the user terminal or network firewalls that are deployed in the network.

Personal firewalls control access on the terminal side by analyzing all network traffic sent and received by the terminal with some additional user control. Network firewalls work in a similar fashion with the main difference that all traffic passing through the firewall is analyzed. The amount of traffic passing through will heavily depend on deployment, i.e. how close to the users the network firewall is deployed. One limitation with these firewalls is that they do not combine the terminal centric analysis with the network centric analysis. Another limitation is that firewalls do not as such identify deviating behaviour, but can only be used once deviating behaviour has been identified.

There is therefore a need for improvement in this field of technology and then especially a need for new mechanisms that can check such applications for enhancing the safety of the user terminal as it is used by an end user and for avoiding network abuse.

SUMMARY

The invention is therefore directed towards avoiding network abuse and enhancing the safety of a user terminal when it is used by an end user.

One object of the invention is thus to avoid network abuse and enhance the safety of a user terminal when it is used by an end user.

This object is according to a first aspect of the invention achieved through a method for determining deviating behaviour of a user terminal. The method is performed in at least one network node of a communication network. In the method a first group of event data sets and a second group of event data sets are obtained, where each group includes at least one event data set. Each event data set in the first group includes user terminal generated event data related to events in a specific user terminal and each event data set in the second group includes network generated event data related to the specific user terminal. In the method a comparison involving the first group of event data sets and the second group of event data sets is then performed and the existence of deviating behaviour of the specific user terminal is determined based on the comparison.

The object is according to a second aspect of the invention achieved through a device in a network node of a communication network for determining deviating behaviour of a user terminal. The device includes at least one communication interface for communicating with other devices related to the communication network and a deviating behaviour determining unit. The deviating behaviour determining unit obtains a first group of event data sets and a second group of event data sets, where each group includes at least one event data set. Each event data set in the first group includes user terminal generated event data related to events in a specific user terminal and each event data set in the second group includes network generated event data related to the specific user terminal. The deviating behaviour determining unit furthermore performs a comparison involving the first group of event data sets and the second group of event data sets and determines the existence of deviating behaviour of the specific user terminal based on the comparison.

The above-mentioned object is according to a third aspect of the invention solved through a computer program product comprising computer program code. When the code runs on a device for determining deviating behaviour of a user terminal that is provided in a communication network, it causes the device to perform a number of steps. First it obtains a first group of event data sets and a second group of event data sets, where each group includes at least one event data set. Each event data set in the first group includes user terminal generated event data related to events in a specific user terminal and each event data set in the second group includes network generated event data related to the specific user terminal. Then the device performs a comparison involving the first group of event data sets and the second group of event data sets and finally it determines the existence of deviating behaviour of the specific user terminal based on the comparison.

The above-mentioned object is according to a fourth aspect of the invention solved through a program product comprising a computer program according to the third aspect and a computer readable means on which the computer program is stored.

A comparison involving the first group of event data sets and the second group of event data sets can be a direct comparison between the event data sets of the two groups. It can also be a comparison of the event data sets of each group with a common reference, such as a certain amount of traffic to be provided by the event data sets in the two groups.

The invention has many advantages. It avoids network abuse and improves the safety of a user terminal in relation to events that occur in it. This is done through comparing activities in the user terminal with information/traces left in the network as a result from the terminals interaction with the network. In this way it is possible to monitor obscure services, correlate between user interaction and network traffic, detect fraudulent behaviour, detect malicious software and detect faults in software. In this way it is possible to enhance the security also when the user terminal is used by an end user and especially in relation to $3^{rd}$ party applications that are downloaded to a user terminal by an end user.

According to one variation of the invention the event data sets in the second group are correlated with the event data sets in the first group. For this reason the device may include also an event data set correlating unit that determines which event data sets belong to the first group and which event data sets belong to the second group. This determination is based on that fact that they are associated with the same service. This variation simplifies the determining of a deviating behaviour if there are many different network generated event data sets for the specific user terminal.

According to another variation of the invention the determining of the existence of deviating behaviour involves determining a deviating behaviour if the first group of event data sets differs from the second group of event data sets. The first group may differ from the second group if there is a discrepancy between data in an event data set in the first group and a corresponding event data set in the second group. It may also differ if there is a discrepancy in numbers of event data sets between the first and second group. In this way it is for instance possible to determine if different carriers are used than what the user terminal is expected to use or if more communication sessions are set up than expected, which may cause a user additional expenses or loss of personal information.

When there is a discrepancy in numbers one of the event data sets in the second group may be obtained from a charge record and concern an electronic message for which there is no event data set in the first group.

It is furthermore possible to determine a service for the user terminal that is linked to the deviating behaviour and perform a change influencing action for obtaining a change in activities that involve both the specific user terminal and the service. The change influencing action can be notifying a device capable of influencing the deviating behaviour or to enforce restrictions in relation to the service. This allows the deviating behaviour to be stopped either through directly imposing restrictions or that the service provider or network operator is informed of the deviating behaviour in order to decide if corrective actions are to be made or not.

According to a yet another variation, the service involves one or more communication sessions engaging the specific user terminal via the network and the change influencing action involves influencing communication sessions in relation to the service and involving the specific user terminal. In this way it is possible to change the deviating behaviour so that undesirable communication sessions are not allowed or changed to desirable communication sessions.

An event data set may include data identifying a service associated with the event, communication session identifying data associated with the event and including at least one communication identifier identifying the user terminal, at least one communication session bearer identifier and time data related to the communication session. The provision of this data simplifies the determining of deviating behaviour and the determining of a possible corrective action.

According to another variation a sequence of tactile user inputs performed via the user terminal are mapped to a reference sequence of tactile inputs in an event data set in the first group in order to determine the service in an event data set in the first group, which may be performed by an event data set modifying unit in the device. This mapping simplifies the determining of the service that is associated with the deviating behaviour.

According to another variation it is possible to receive user terminal generated event data sets in the from the user terminal, perform the mapping on these event data sets, modify the received event data sets with data identifying determined services and store the modified event data sets in an event data base. Here the obtaining of the first group of event data sets involves fetching the first group of event data sets from the event data base.

It is also possible to generate event data sets based on charge records and event records in the network and store these event data sets in an event data base. The obtaining of the second group of event data sets here involves fetching the second group of event data sets from the event data base before performing the comparison.

It is according to another variation of the invention possible to store event data sets for which deviating behaviour has been determined in an analysis data base, fetch event data sets from the analysis data base, analyse these event data sets and change the rules for determining deviating behaviour based on said analysis. This allows improvements to be made in the determining of a deviating behaviour because of changes that occur in the actions made by a user terminal in relation to a service.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The invention will now be described in more detail in relation to the enclosed drawings, in which.

DETAILED DESCRIPTION

Figure 1:
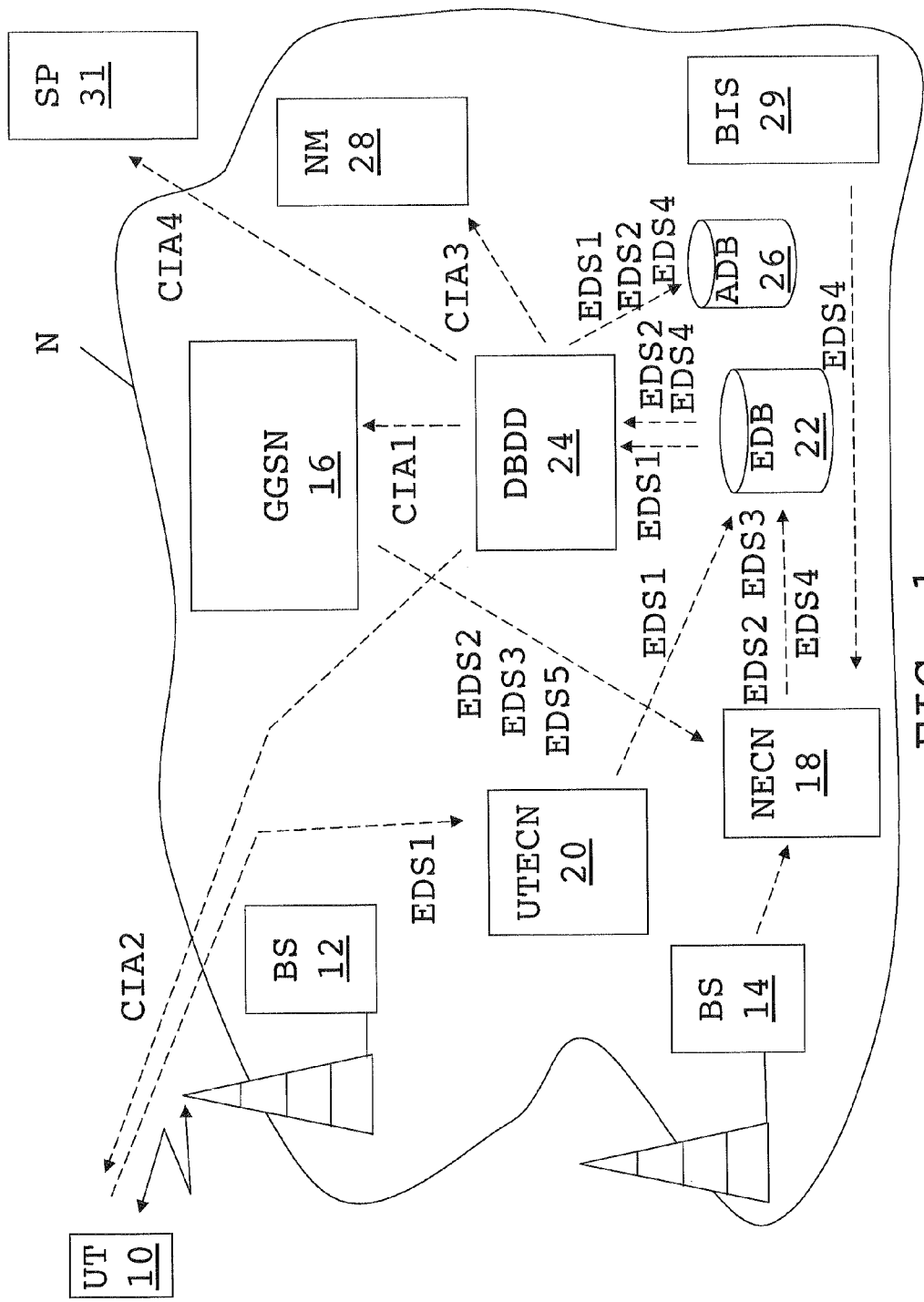
FIG. 1 schematically shows a user terminal and a communication network in which a device for determining deviating behaviour of a user terminal according to the invention is provided.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail.

The invention is generally directed towards enhancing the safety of a user terminal when it is in use by an end user.

User terminals which may be such diverse things as cellular phones, gaming machines, laptop computers, palm top computers, electronic organizers etc., can nowadays include more and more diverse functionality. Such functionality can be provided as a part of a service, being provided by a service provider. Services can here be provided by the network operator, the user terminal manufacturer and also by third parties, which may be a so-called 3$^{rd}$ party service provider. Applications handling such services functionality can in many instances also be downloaded into a user terminal via the network. Services can include such things as games. However, also other types of services are possible, like social communication services such as Facebook, Youtube etc. Some of there services may also be enhanced in that they also use communication.

In such an environment it is possible that an application being associated with an enhanced service does not operate as expected by the user of the user device, by the manufacturer of the user device, by the network operator or even by the service provider itself. It is for instance possible that the user terminal engages in communication sessions that the user is not aware of, engages in communication sessions using carriers that the user is not aware of, exports data from the user terminal the user is not aware of, does not end started communication sessions etc. Such behaviour, which thus deviates from the expected behaviour, may then furthermore not be visible to the user of the user terminal. It may be hidden for him or her. Such hidden communication can then lead to the user getting unsuspected undesirable costs or being subject to other undesirable activities. It may also constitute a problem for network operators in that if many users are subject to such undesirable communication, the communication network may get congested. They may therefore also be concerned about abuse of their network for instance by fraudulent 3$^{rd}$ party providers. Such use may also lead to the operator losing goodwill with a consequential loss of customers.

The reason for such undesirable behaviour may be caused by the application being malicious. However, the application may also be operating in a deviating way because it is malfunctioning, i.e. there are bugs.

In view of this there is therefore a need to obtain better network control of a user terminal and then more particularly to provide this control via a communication network, which the user terminal is using for communication in relation to the service. The invention is directed towards providing such better network control.

The invention will now be described in more detail in the non-limiting example context of a communication network N that may be a WAN (Wide Area Network). The network N is shown in FIG. 1. This network N may here be a cellular network such as an UMTS (Universal Mobile Telecommunications System) network or an LTE (Long Term Evolution) network. However it may also be a landline network. To the network N there is connected a first user terminal UT 10, which in the present example is a cellular phone. As was mentioned earlier, a cellular phone is merely one example of a user terminal with which the invention may be used.

In the communication network N there is a first and a second base station 12 and 14, where the first user terminal 10 is communication with the first 12 of these. In the communication network N there is also provided a user terminal event data set collection node UTECN 20, which receives event data sets from the user terminal 10 via the first base station 12. These event data sets are here exemplified by a first event data set EDS1. What such an event data set may look like will be described in more detail later on.

In the communication network N there is also a network node in the form of a GGSN (Gateway GPRS Support Node) node 16, which is responsible for handling communication sessions between user terminals connected to the network and other terminals. It is more particularly responsible for handling communication sessions between the first user terminal 10 and other terminals. This GGSN node 16 may be provided with one or more firewalls for barring traffic in the network. The GGSN node 16 also provides network generated event data sets such as event records in the form of CDRs (Call Detail Records) for communication sessions that it handles. These event data sets include event data sets that have been generated based on communication sessions involving the first user terminal 10. The network also includes a network management unit NM 28.

In the network N there is also a network event data set collection node NECN 18. This node 18 communicates with the GGSN node 16, in order to receive network generated event data sets such as CDRs (Call Detail Records) and with a billing system BIS 29 in order to receive charge records in the form of EDRs (Event Data Record). The network event data set collection node 18 is here shown as receiving a second event data set EDS2 in the form of an EDR from the GGSN node 16, a third event data set EDS3, also in the form of an EDR, from the GGSN node 16, a fourth event data set EDS4 in the form of a CDR from the billing system BIS 29 and finally a fifth event data set EDS5 in the form of an EDRs from the GGSN node 16. It should be realized that the number of event data sets are here limited in order to explain the invention. It should also be realized that normally there are many more being sent through the communication network N.

In the communication network N there is furthermore an event data base EDB 22. The user terminal event data set collection node UTECN 20 stores event data sets including the first event data set EDS1, perhaps after modification or processing, in the event data base EDB 22. Also the network event data set collection node 18 stores event data sets, including the second, third and fourth event data sets EDS2, EDS3 and EDS4 in the event data base EDB 22. However since event data sets are obtained from different sources, there may here be event data sets concerning the same event from the billing system and the network event a data set collection node 18. In this case duplicate event data sets are not being stored in the event data base 22.

This is exemplified by the fact that the fifth event data set EDS5, which concerns the same event as the fourth event data set EDS4 is not stored in the event data base EDB 22.

In the communication network N there is furthermore a network node in the form of a deviating behaviour determining device DBDD 24 which collects a first and second group of event data sets from the event data base 22 in order to determine a deviating behaviour of a specific user terminal. In an example of the invention given here, the specific user terminal is the first user terminal 10. Here the first group is exemplified by the first event data set EDS1 and the second group is exemplified by the second and fourth event data sets EDS2 and EDS4. In dependence of if the deviating behaviour determining device 24 determines that a specific user terminal, here the first user terminal 10, has a deviating behaviour, it then performs one or more change influencing actions. These change influencing actions here also involve sending change influencing action messages. As an example here it sends a first change influencing action message CIA1 in relation to the GGSN node 16, a second change influencing action message CIA2 in relation to the user terminal 10, a third change influencing action message CIA3 in relation to a network management unit NM 28 and a fourth change influencing action message CIA4 in relation to a device 31, like a server, of a service provider SP. This service provider is here not a part of the communication network N. Also the first user terminal 10 is here considered not to be a part of the network, although it may be considered to be so in some situations.

The deviating behaviour determining device 24 may here determine that there is a deviating behaviour of the first user terminal. Event data sets associated with this may then be stored by the device in an analysis data base ADB 26, which is exemplified by the first, second and fourth event data sets EDS1, EDS2 and EDS4 being stored there.

The various nodes in the communication network N, i.e. the deviating behaviour determining device 24, the base stations 12, 14, the data collection nodes 18, 20 the network management unit 28, the GGSN node 16 the billing system 29 and the data bases 22 and 26 may all communicate with each other and other entities inside and outside of the network using a standardised computer communication protocol, such as TCP/IP. Communication may therefore be connectionless. Communication is therefore indicated in FIG. 1 by dashed arrows, since there are many paths via which communication may take place. However, the first user terminal 10 is in direct connection and here in direct wireless connection with a base station 12 and therefore this connection is not shown with dashed arrows. It should however be realized that as an alternative it is possible that also the communication over the wireless interface may be indirect, i.e. that a user terminal communicates with the network via another user terminal.

Figure 2:
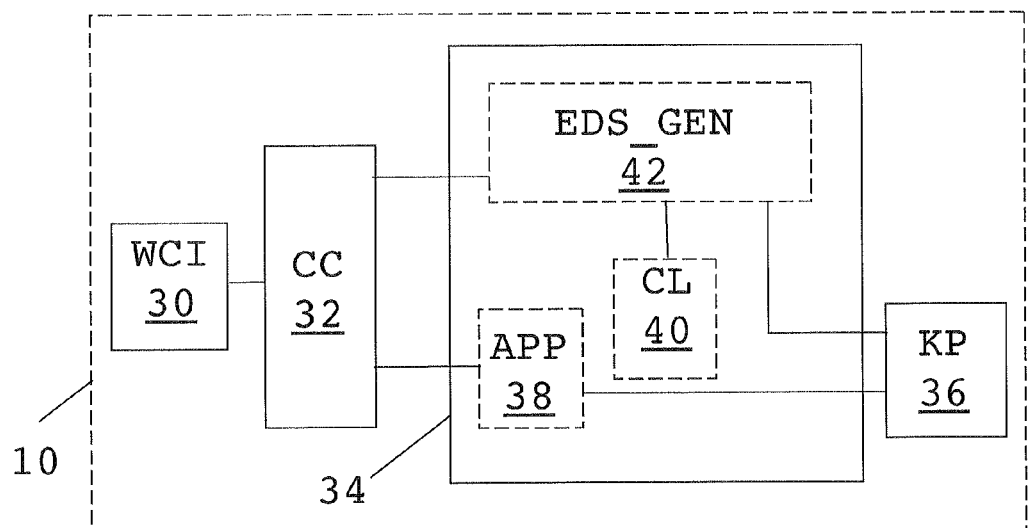
FIG. 2 shows a simplified block schematic of a user terminal having functionality that assists in the determination of deviating behaviour.

FIG. 2 shows a block schematic of the first user terminal 10 for use with the communication network. The user terminal 10 includes a wireless communication interface WCI 30 connected to a communication control unit CC 32. The communication control unit 32 typically provides such functionality as communication according to communication protocol, while the interface provides modulation of signals onto a carrier. The communication control unit 32 is here also connected to a function control unit 34. The function control unit 34 controls the various functions of the user terminal 10 and is normally provided in the form of a processor with associated program memory. It then provides a number of functional units, such as various application handling units, handling different applications. One application handling unit APP 38 is here shown as an example. An application handling unit may here handle an application that is related to a service provided by a service provider, such as a using a service. In order to let a user of the user terminal 10 to access applications such as the one provided by the application handling unit 38, this application handling unit 38 is connected to a tactile user input unit, which is here a keypad KP 36. The user terminal may furthermore be provided with a terminal firewall that is set to block communication according to some blocking criteria.

In order to be able to generate event data sets that are used in the present invention, the function control unit 34 also includes an event data set generating unit EDS_GEN 42. This event data set generating unit 42 is also connected to the tactile user input unit 36, to a clock 40 in the function control unit 34 as well as to the communication control unit 32. Here the units in the function control unit 34 are provided as program code to be run on the processor and as they are a part of the function control unit 34, they are here shown as dashed boxes, while the other entities are shown as solid boxes.

Figure 3:
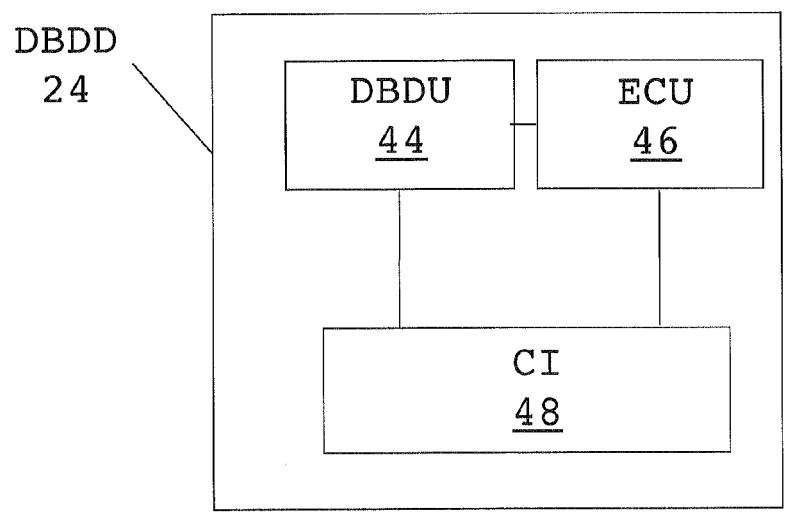
FIG. 3 shows a simplified block schematic of a device for determining deviating behaviour of a user terminal according to a first embodiment of the invention, FIG. 4 schematically shows the contents of a first table T1 of an event data base in the network, FIG. 5 schematically shows the contents of a second table T2 of the event data base.

FIG. 3 shows a block schematic of a deviation behaviour determining device 24 according to a first embodiment of the present invention. In this embodiment it includes a communication interface CI 48 for communicating with other devices of or in contact with the communication network. This communication interface 48 is connected to a deviating behaviour determining unit DBDU 44 as well as to an event data set correlating unit ECU 46. The communication interface 48 is here a normal communication interface for communicating via computer communication networks, such as an Ethernet communication interface. Here it furthermore includes protocol handing functionality for enabling communication over the communication network. The deviating behaviour determining unit DBDU 44 is also connected to the event data set correlating unit 46, and both these units 44 and 46 are with advantage also provided in the form of a processor with associated program memory including program code for performing the functionality of these units when being run on the processor.

FIG. 4 shows a first table T1 of event data sets being stored in the event data base EDB 22. The table T1 here includes a number of rows, where each row is associated with a specific event. This table T1 is furthermore associated with network related events. This means that this database includes events registered by the communication network in relation to all user terminals that are communicating with it. If the network is large there can be a great number of such events registered. The numbers are here limited to three in order to simplify the description of the invention. In the first table T1, the second event data set EDS2, the third event data set EDS3 and the fourth event data set EDS4 are stored. For each of these event data sets there is provided a communication indicator indicating the user terminal or a user terminal identifier ID, which may be an IMSI, IMEI or a cellular phone number associated with the user terminal.

There is also communication session identifying data. The communication session identifying data includes source and destination data in relation a communication session involving a concerned user terminal. It here includes source address S_ADR, typically an IP-address, and a source port number P, destination address D_ADR typically also an IP address and a destination port number P. A source or destination address can also be used as a communication indicator indentifying the user terminal. The communication session identifying data also includes a communication session bearer identifier or carrier data C as well as time data T related to the communication session. Also protocol data may be included (not shown). Each event data set in this example finally also includes data indentifying a service in the form of an identifier identifying a service S with which the event data set is associated. In order to exemplify the functioning of the present invention, the second event data set EDS2 includes an identifier UT1 of the first user terminal 10, a source address ADR1 and a source port number P1 associated with this first user terminal, a destination address ADR2 and a destination port number P2, which are here associated with the service provider in FIG. 1, an identifier C1 of a carrier of a first type as well as time data T1-T2 indicating the duration of the event for which the second event data set EDS2 has been generated and an identifier S1 identifying the associated service, which is here a service associated with the service provider in FIG. 1.

In the same manner the third event data set EDS3 includes an identifier UT2 of another user terminal, a source address ADR3 and a source port number P1 associated with this other user terminal, a destination address ADR4 and a destination port number P2, which are here associated with another service provider, a carrier C1 of the first type as well as time data T1-T2 indicating the duration of the event and an identifier S2 identifying the associated service, which is thus a different service than the one associated with the second event data set EDS2. The fourth event data set EDS4 includes an identifier UT1, which is also the identifier of the first user terminal 10, a source address ADR1 and a source port number P1 associated with this user terminal, a destination address ADR2 and a destination port number P1, which are here also associated with the service provider in FIG. 1, a carrier C2 of a second type as well as time data T3-T4 indicating the duration of the event and an identifier S1 identifying the associated service, which is the same as the service identified for the second event data set EDS2.

As mentioned earlier the event data sets shown here are only exemplifying and the table normally includes many more event data sets. Each event data set may also include protocol identifying data, such as data identifying the TCP, UDP and HTTP protocols. In the table T1 in FIG. 4 the event data sets all identified source addresses associated with user terminals and destination addresses associated with service providers. It should here be realised that the event data sets sorted in the table normally also includes event data sets where a user terminal has the destination address and another device the source address. The address of the entity with which a user terminal communicates may here be a different address than the address of the service provider with which the event data is associated. It can thus be the address of another entity.

FIG. 5 shows a second table T2 of event data sets being stored in the event data base 22. This table T2 has the same structure as the first table and thus includes the same type of data. However, this table T2 only includes event data sets related to event data being generated by a specific user terminal. This table in FIG. 5 is furthermore associated with the first user terminal in FIG. 1. Normally there is according to the invention provided one such table for each user terminal that is to be investigated concerning deviating behaviour.

In more detail the second table T2 includes data of the first, a sixth and a seventh event data set EDS1, EDS6 and EDS7. The first event data sets EDS1 includes an identifier UT1 of the first user terminal, a source address ADR1 and a source port number P1 associated with this first terminal, a destination address ADR2 and a destination port number P2, which are here associated with the service provider in FIG. 1, there is also a carrier C1 of a first type as well as time data T1-T4 indicating the duration of the event and an identifier S1 identifying the associated service, which is here the service associated with the service provider in FIG. 1. The sixth event data set EDS6 includes an identifier UT1 of the fist user terminal, a source address ADR1 and a source port number P1 associated with this first terminal, a destination address ADR2 and a destination port number P2 which are associated with the service provider in FIG. 1, a carrier C1 of the first type as well as time data T5-T6 indicating the duration of the event and an identifier S1 identifying the associated service. Finally the seventh event data set EDS7 includes an identifier UT1 of the first user terminal, a source address ADR5 and a source port number P5 associated with a service provider, a destination address ADR1 and a destination port number P1, associated with this first user terminal, a carrier C2 of the second type as well as time data T7-T8 indicating the duration of the event and an identifier S2 identifying the associated service.

Figure 6:
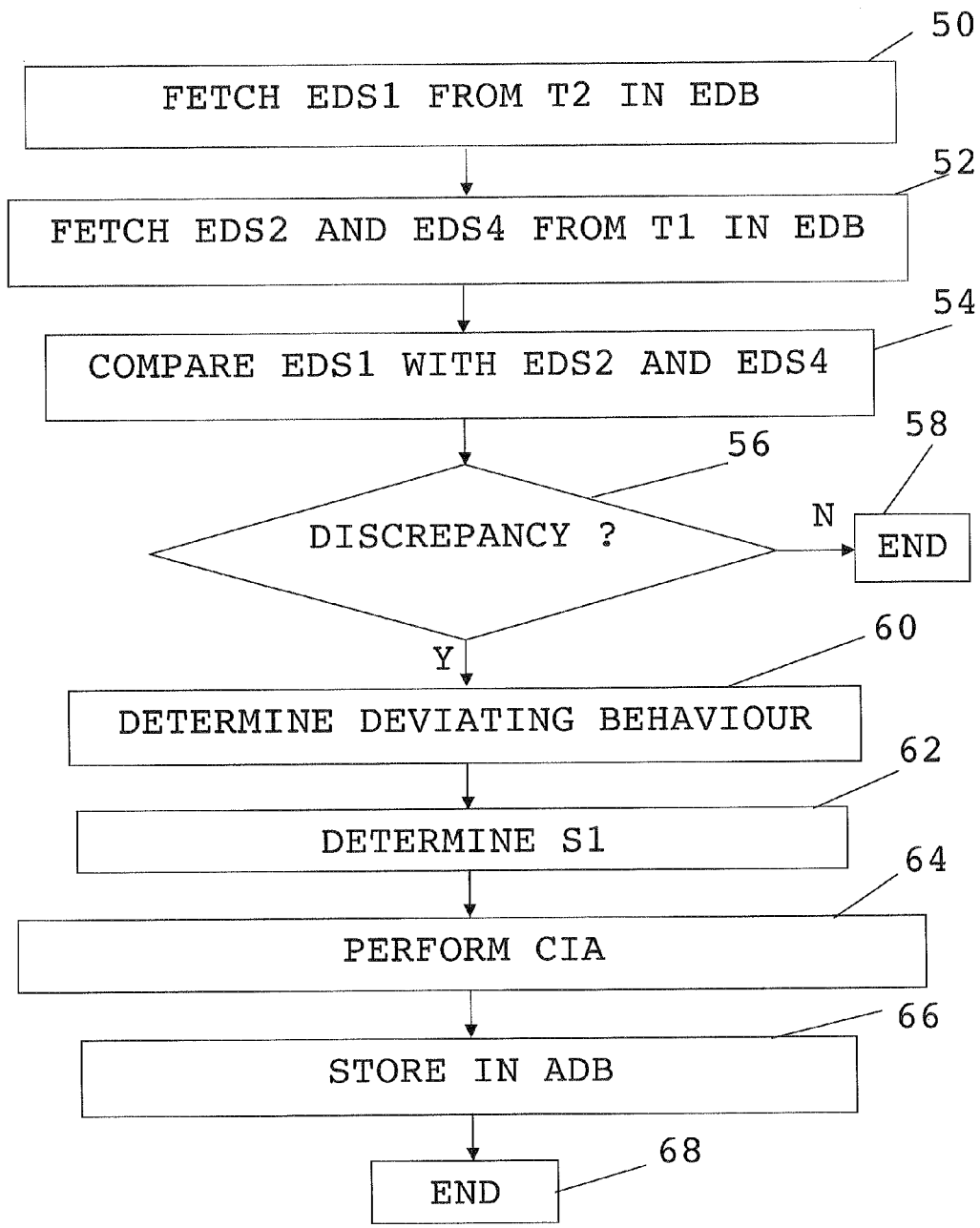
FIG. 6 shows a flow chart of a number of method steps being performed in a method for determining deviating behaviour of a user terminal according to the first embodiment of the invention.

Now the functioning of the first embodiment of the invention will be described in relation to the previously mentioned FIG. 1-5 as well as with reference being made to FIG. 6, which shows a flow chart of a number of method steps being performed in a method for determining deviating behaviour of a user terminal.

The first user terminal 10 provides the network with event data sets the contents of which end up in the second table T2 of the event data base 22. An event may in this respect be a communication session in which the first user terminal is involved, which may be a voice, video or conference session as well as a messaging communication session, like sending and receiving electronic messages. In order to do this the event data set generating unit 42 of the first user terminal 10 monitors the keypad 36. It then registers sequences of tactile user inputs that are being made by a user via the keypad 36, i.e. which keys are depressed and in what order they are depressed by this user, who may be an end user or consumer. The tactile user input sequence is furthermore correlated with time obtained via the clock 40.

The sequences are then in this first embodiment analysed by the event data set generating unit 42 through being compared with and mapped to known reference sequences of tactile inputs or templates of sequences. One such known sequence may then typically be associated with the user selecting an application that is related to a service provided by a service provider via the network, another sequence with selections being made in this application and yet another sequence with the exiting or deselecting of the application. The application may for instance be a messaging application, like an SMS or MMS sending application, or an application handling a client side of a service provided by the service provider 31. The application identified in this way may be an application handled by the application handling unit 38 in the first user terminal 10, which application handling unit thus handles an application that provides a service to the user.

The event data set generating unit 42 also receives data from the communication control unit 32, which information includes communication session data of communication sessions in which the first user terminal is involved. This communication session data includes source and destination addresses and associated port numbers, carriers used and timing of these communication sessions. It may here also receive information about protocols used for these sessions. Based on the sequence of tactile user input data the event data set generating unit 42 then determines with which service communication sessions are being engaged and generates an event data set including information such as user terminal identity, address data, carrier data timing data and service identifying data and optionally protocol data for each such communication session that is identified. The data may here include all the data shown for the first event data set EDS1 in the second table T2. Such an event data set may here with advantage be provided in the form of an XML-document. In this way the event data set generating unit generates a first event data set EDS1 including the above mentioned information about a communication session between the first user terminal and the service provider 31 concerning a first service S1, and sends it via the communication control unit 32 and the wireless communication interface 30 to the user terminal event data set collection node 20 via the first base station 12. The first user terminal 10 may then continue to send event data sets to the user terminal event data set collection node, like the sixth and the seventh event data sets EDS6 and EDS7.

The user terminal event data set collection node 20 is able to interact with the event data set generating unit 42 in the user terminal 10. Interaction can be asynchronous and initiated from either side. The user terminal event data set collection node 20 may be able to control the event data set generating unit 42 unless explicitly overridden by the user. Therefore, when the user terminal event data set collection node 20 receives the first event data set EDS1 it modifies it for storing in table format in the second table T2 of the event data base 22. It thus extracts the data from the XML document and forwards it for inserting in the second table T2 of the event data base 22. The user terminal event data set collection node 20 may request the event data set generating unit in the first user terminal to supply event data sets at recurring time intervals, like every 24 hours, every week etc. The user terminal event data set collection node may furthermore decide what data that is to be included in event data sets generated by the event data set generating unit, i.e. what data the event data set generating unit in the first user terminal is to collect. The network operator may therefore determine when event data sets are to be collected, what they are to include and the format they are to be provided in.

While this is done the network event data set collection node 18 collects event data sets in the form of CDRs from the GGSN node 16. Here it receives the second, third and the fifth event data sets EDS2, EDS3 and EDS5 from the GGSN node 16 and the fourth event data set EDS4 in the form of an EDR from the billing system 29, where the second, fourth and fifth event data sets EDS2, EDS4 and EDS5 are associated with the first user terminal 10 and communications sessions between it and the service provider 31 concerning a first service S1, while the third event data set EDS3 is associated with communication sessions of another user terminal and another network entity concerning another service S2. The network event data set collection node 18 then extracts the data from the first, third and fourth event data sets EDS2, EDS3 and EDS4, provides new event data sets based on these and stores them in the table format of the first table T1 in the event data base 22. Since there are event data sets received from GGSN node as well as from the billing system, there is, as was mentioned earlier, a risk that event data sets concerning the same activity are received, i.e. that there is duplicate information. In this case redundant event data sets are removed. The first table may thus be cleaned in order to avoid duplicate entries but also in order to avoid corrupt data. In the present example the fifth event data set EDS5 includes the same information as the fourth event data set EDS4 and therefore it is not stored in the event data base 22. Here it should be realized that the situation may of course be reversed in that the fifth event data set is stored in the event data base, while the fourth event data set is not. The network event data set collection node 18 may also be able to control a network firewall provided for instance in relation to the GGSN node 16.

In this way the first table T1 of the event data base 22 is filled with network generated event data sets concerning several user terminals in the network and the second table T2 of the event data base 22 is filled with user terminal generated event data sets only concerning the specific first user terminal 10 and thus only being related to events in a specific user terminal.

Event data sets concerning the first user terminal 10 are then investigated by the deviating behaviour determining device 24 in order to determine if the specific user terminal has a deviating behaviour in relation to the first service S1.

In order to simplify this process the event data set correlating unit 46, which in this first embodiment is a part of the deviating behaviour determining device 24, correlates the event data sets with each other, i.e. it determines which event data sets in the first and second tables are linked to each other. The event data set correlating unit takes one event data set from one table and finds matches in the other. Which way to initiate the correlation search depends on the order in which the event data sets are received. The correlations can be stored in a separate database or as dependencies in the event data base 22. The correlation between terminal data and network data may be performed on a per-user basis, and based on logged time both on the terminal and network side. In order to synchronize messages a relative clock may furthermore be kept between the user terminal event data set collection node and the network event data set collection node. Determination of which event data sets to be provided in the first and the second groups can be done through for instance event data sets being linked to the same service during a common time period.

The event data set correlation unit 46 therefore connects to the event data base 22 via the communication interface 48 for searching events data sets in the event data base. More particularly it forms a first group of event data sets from event data sets in the second table T2 including at least one event data set and a second group of event data sets also including at least one event data set from event data sets in the first table T1. The event data sets all relate to a number of events being linked to the same service as well as to the same specific user terminal. In the example given here the first group is made up of all event data sets involving the first user terminal in relation to the service S1 in a certain time interval, which is here set to the time interval T1-T4. In a similar manner the second group is made up of all event data sets involving the first user terminal in relation to the same service and the same time interval. From this it can be seen that the first group will in the example only include one event data set, the first event data set EDS1, while the second group will include two event data sets, the second and fourth event data sets EDS2 and EDS4.

These correlated groups are then according to this first embodiment stored back into the event data base 22 with a marking of them being correlated to each other.

Correlated event data sets can as an alternative be stored in a separate correlation data base, directly accessible to the deviating behaviour determining unit 44 for determining deviating behaviour. The first and second groups could furthermore be directly provided to the deviating behaviour determining unit 44 in order to directly determine if the first user terminal has a deviating behaviour. The event data set correlating unit can furthermore also be provided as a separate device or network node in the communication network for instance through a processor with corresponding program memory being connected to a network interface unit.

In order to determine if the first user terminal has a deviating behaviour or not, the deviating behaviour determining unit 44 of the deviating behaviour determining device 24 according to this first embodiment obtains the first group of event data sets from the second table T2 in the event data base 22 via the communication interface 48. As the first group only included the first event data set EDS1 in the example given here, it fetches the first event data set EDS1 from the second table T2 of the event data base 22, step 50. Thereafter the deviating behaviour determining unit 44 obtains the second group of event data sets from the first table T1 of the event data base 22 via the communication interface 48. As the second group here only includes the second and the fourth event data sets EDS2 and EDS4, the deviating behaviour determining unit 44 fetches the second and fourth event data sets EDS2 and EDS4 from the first table T1 in the event data base 22 via the communication interface 48, step 52. As this has been done the deviating behaviour determining unit 44 then performs a comparison involving the first group of event data sets and the second group of event data sets and here compares the first group of event data sets with the second group of event data sets. In the specific example given here it furthermore compares the first event data set EDS1 with the second and the fourth event data sets EDS2 and EDS4, step 54.

The comparison can be made concerning any of the communication session related data and service related data in the event data set, such as carrier, duration of a session, addresses and/or port numbers used and possibly protocols. It can also or additionally be a comparison regarding the number of event data sets in the two groups, such as if there are more event data sets in the second group than in the first. It can furthermore be a comparison regarding if the event data sets behave as they should, i.e. that they follow a set of rules provided for the service, for instance that they use a preferred carrier or that the group includes a correct sequence of event data sets. A behavioural comparison can furthermore be that the amount of traffic indicated by the event data sets in the two groups deviate from an amount of traffic that should occur in relation to the service, for instance if there is more traffic than what should occur. A deviating amount of traffic may here be a deviating amount of transferred data, which can be determined through the length of communication sessions and types of carriers and protocols used. A deviating amount of traffic can also be a deviating number of communication sessions, perhaps sorted according to carrier and/or protocol. The deviating behaviour determining unit thus examines the correlated events in order to find deviating behaviour. If for instance the first group indicates one SMS has been sent and the second group indicates that three SMS have been sent, then a deviating behaviour may be determined. In this exemplifying embodiment it is the number of event data sets that is compared. As can be seen there are in the time interval T1-T4 two event data sets EDS2 and EDS5 in the second group, each associated with a separate communication session involving the first user terminal but only one in the first group EDS1. The fifth event data set EDS5 is furthermore using a second type of carrier C2, while the first and the second are using a first type of carrier C1. Based on one or more of these differences the deviating behaviour determining unit 44 of the deviating behaviour determining device 24 determines that there is a discrepancy between the two groups. As can be seen one of the event data sets in the second group is obtained from a charge record, the fourth event data set EDS4. In the present example this concerns an electronic message, indentified through the carrier C2, for which there is no corresponding event data set in the first group.

The deviating behaviour determining unit thus filters out deviating behaviour, which may be done through comparing the normal behaviour of a service and its correlation between events in the first group and the second group. When a new service deviates from normal conditions or an old service starts to behave differently an alert may be raised.

If there is a discrepancy, step 56, i.e. if there is a difference either in content and/or in numbers and/or from normal behaviour, then the deviating behaviour determining unit 44 determines that the specific user terminal has a deviating behaviour, step 60, while if there is no discrepancy, step 56, then no deviating behaviour is determined and the investigation is ended, step 58.

If a deviating behaviour is determined, step 60, then the deviating behaviour determining unit 44 determines which service S is associated with the deviating behaviour, step 62, i.e. it determines a service for the user terminal that is linked to the deviating behaviour, which service typically involves one or more communication sessions engaging the first user terminal. This may be done through investigating the service setting in the compared data sets. If there are different settings, the settings in one group may be the one that defines the associated service. Here the service is determined to be the first service S1. The existence of a deviating behaviour is thus determined based on the comparison. Thereafter the deviating behaviour determining unit 44 performs at least one change influencing action CIA for obtaining a change in activities involving both the specific user terminal and the service, step 64. A change influencing action could thus be the sending of a change influencing action message that may a message for influencing communication sessions in relation to the service and involving the first user terminal. This may be an instruction to a network element to stop communication in relation to the service. It can thus be an order to the GGSN node to introduce a block in relation to network access for some specific software in a network firewall. A change influencing action can thus be the sending of a first change influencing action message CIA1 in the form of an instruction or a command to the GGSN node or the sending of a second change influencing action message CIA2 as an instruction or command to the user terminal 10. Such a message may enforce restrictions in relation to the service for the user terminal. When being sent to the first user terminal, the instruction is with advantage sent to the event data set generating unit 42, which may include a blocking functionality, through which filtering or blocking access is performed for software that is suspected to be malicious for instance through controlling a terminal firewall. The event data set generating unit 42 in the user terminal can therefore act as a filtering mechanism stopping or temporarily blocking malicious software of an application handling unit by controlling a terminal firewall. This can happen in several different ways: 1) completely blocking the software from executing, 2) blocking all network access for the software.

The deviating behaviour determining unit can further include Machine Learning techniques in order to derive fraudulent behaviour and classify malicious software. By correlating the actions from the terminal with the network data, faults in the network or bugs in the software can be detected, this information can be useful for both the user and the service provider.

The change influencing action used in relation to the GGSN node 16 and user terminal 10 can therefore also be the sending of an alarm or alerting message, i.e. a notifying message to a device that is capable of influencing the deviating behaviour. A third change influencing action message CIA3 and/or a fourth change influencing action message CIA4 that may be sent are alarm or alerting messages to the network management unit 28 or to the indentified service provider 31 for informing these about deviating behaviour. Here it is possible that type of change influencing action message, like a command or an alarm, and the receiving entity of such an change influencing action message is selected based on the degree or type of deviation. In the case of an alarm or alerting message, the receiving entity can thereafter decide on the proper action to be made in relation to the first user terminal. The change influencing action can also involve sending an instruction to change carrier for a particular service of the user terminal 10, for instance a change from the second to the first carrier. Also the change influencing message to the user terminal can be such an instruction message.

Thereafter the event data sets for which discrepancies have been found are according to the first embodiment stored by the deviating behaviour determining unit 44 in the analysis data base ADB 26 via the communication interface 48, step 66. This is done in order to enable analysis of deviating patterns to be made for user terminals. This can then be used for changing the pattern considered to be normal behaviour. After this has been done the analysis is ended, step 68.

Through storing these event data sets for which discrepancies have been found in the analysis data base, it is possible for the deviating behaviour determining device or for another node in the network to fetch event data sets from the analysis data base, analyse these fetched event data sets and then change the rules for deviating behaviour.

Deviating behaviour can be dealt with by using one or more of the following options:

a. Temporarily blocking the service in the event data set generating unit of the user terminal
b. Notifying the user
c. Block events from the identified service in the network
d. Alert the network management system In addition the deviating behaviour determining device can:

e. Create explicit logs
f. Run checks for other users of the identified service
g. Require user input When appropriate immediate actions are taken the deviating behaviour determining device flags the identified service for follow up allowing the operator to create long term rules for handling the service. Explicit feedback from users can be used to identify truly deviating behaviour and behaviour that is normal in the service context.

Through the present invention the event data set generating unit in the user terminal can record and extract the user interaction with the user terminal. The type of information logged in the user terminal is controlled from the network, and also time stamped so that it is possible to compare this information with the information/traces left in the network as a result from the terminals interaction with the network.

The present invention as realized by the deviating behaviour determining device also enables detection of malicious software deployed on the terminals. Examples of typical malicious usage that it is possible to detect includes, (but is not limited to:

sending SMS/MMS: Ensuring that the number of SMS/MMS messages sent by the user matches the SMS/MMS messages seen from the network side. This allows for detection of software that sends SMS/MMS in the background without the user consent.

Data Access: Detect that all packet data accesses to the network are intended by the users and not hidden in malicious software. This is especially important in roaming situations where the cost per MB is very high.

Privacy information: Detect that information about the user, user phonebook only is uploaded/downloaded when intended by the user.

Making phone calls. Similar to sending SMS the invention can detect those phone calls that are not issued by the user, thus preventing, for example, software to call a premium-rate telephone numbers. I.e. the user thinks he is making a local call but ends up calling a a number with which extensive costs are associated.

The invention thus has a number of further advantages. It avoids network abuse by $3^{rd}$ party service providers. It enhances the safety of a user terminal when in use by an end user, i.e. a consumer. This can furthermore be done after a $3^{rd}$ party application provided by a service provider has been downloaded into the user terminal by the end user. The advantages further include but are not limited to monitoring of obscure services, correlation between user interaction and network traffic, detection of fraudulent behaviour, detection of malicious software, fault detection in software, helping in keeping a terminal firewall continuously up to date by synchronizing terminal and network activities, controlling user terminal monitoring from the network, which minimizes the need for unnecessary time-consuming logging, and enabling the possibility to control/synchronize states in both user terminal firewall and network firewall.

In the first embodiment the event data set generating unit determined which service was associated with a certain event. It is according to the invention possible that this is done in the network instead. According to a second embodiment of the invention this is done by the deviating behaviour determining device 24.

Figure 7:
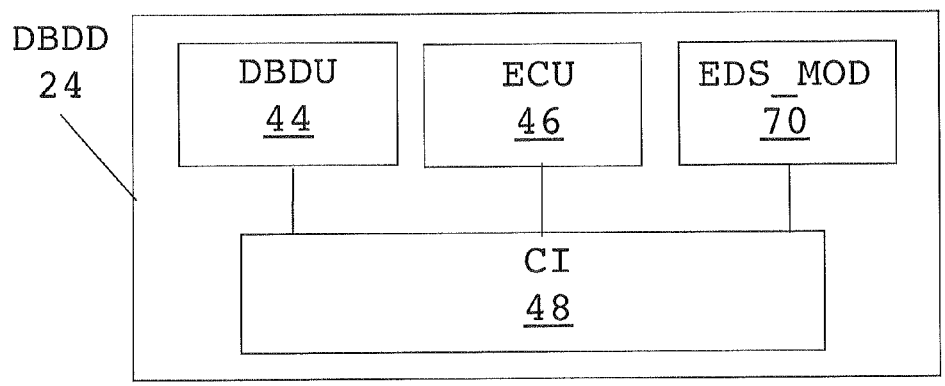
FIG. 7 shows a simplified block schematic of a device for determining deviating behaviour according to a second embodiment of the invention.

FIG. 7 shows a block schematic of a modified deviating behaviour determining device 24 according to this second embodiment. Here there is an event data set modifying unit 70 connected to the communication interface in addition to the deviating behaviour determining unit 44 and the event correlating unit 46.

Figure 8:
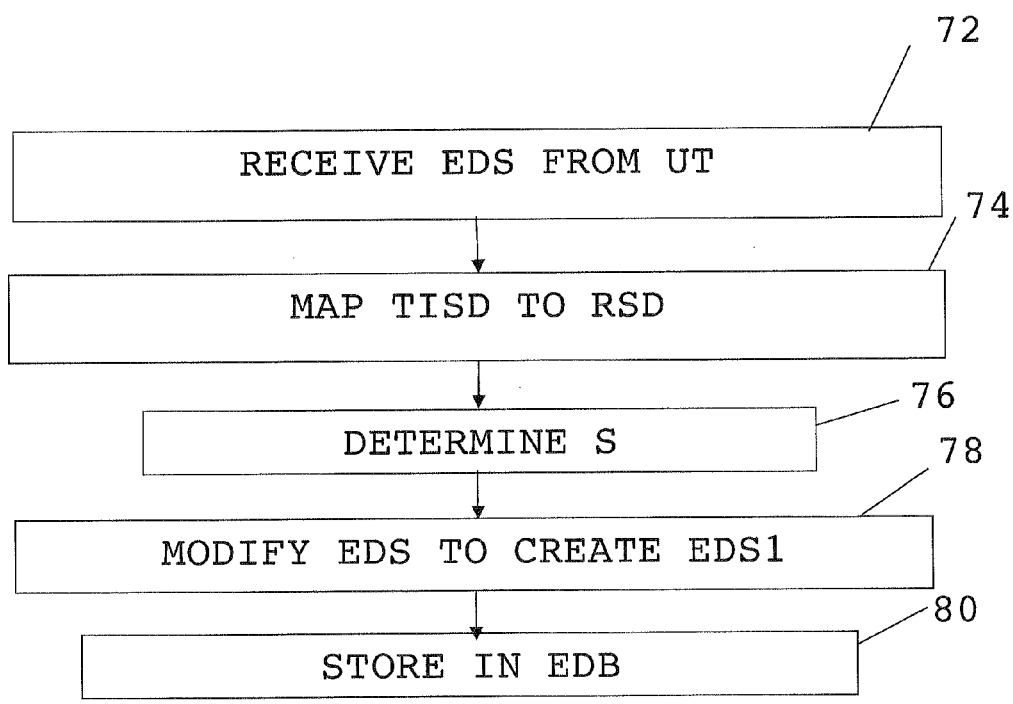
FIG. 8 shows a flow chart of a number of method steps for determining a service that is associated with a sequence of tactile user inputs performed via the user terminal.

FIG. 8 shows a flow chart of a number of steps being performed by the event data set modifying unit 70 of FIG. 7. Here the event data set generating unit of the user terminal collects the data concerning an event as described in the first embodiment. However, it does not perform any mapping of tactile input sequences to service, instead it sends the tactile input sequence data, together with the communication session data, for instance in the form of an XML file to the event data set modifying unit 70 of the deviating behaviour determining device 24. This event data set EDS includes the previously mentioned communication session identifying data together with tactile input sequence data TISD, i.e. data identifying a sequence of tactile user inputs made into the user terminal UT 10, and is thus received by the event data set modifying unit 70, step 72. The tactile user input sequence data TISD is then mapped to reference sequence data RSD, step 74, in the same way as was done in the user terminal in the first embodiment and then the service S is determined based on this mapping, step 76. Thereafter the event data set modifying unit modifies the event data set EDS in order to create the first event data set EDS1, step 78, i.e. in order to also include the data identifying the associated service S, which in the given example was the service S1. Thereafter the event data set modifying unit 70 stores the modified event data set EDS1 in the event data base EDB, step 80.

It should here be realized that this modification need not be made in the deviating behaviour determining device 24, but could just as well have been performed in the user terminal event data set collection node or in a separate event data set modifying node of the communication network.

It is furthermore possible that the event data base is not used, but that the deviating behaviour determining device determines a deviating behaviour in real time. In this case the deviating behaviour determining device could only include the deviating behaviour determining unit together with the communication interface. As an alternative it could also be combined with the event data set modifying unit.

Figure 9:
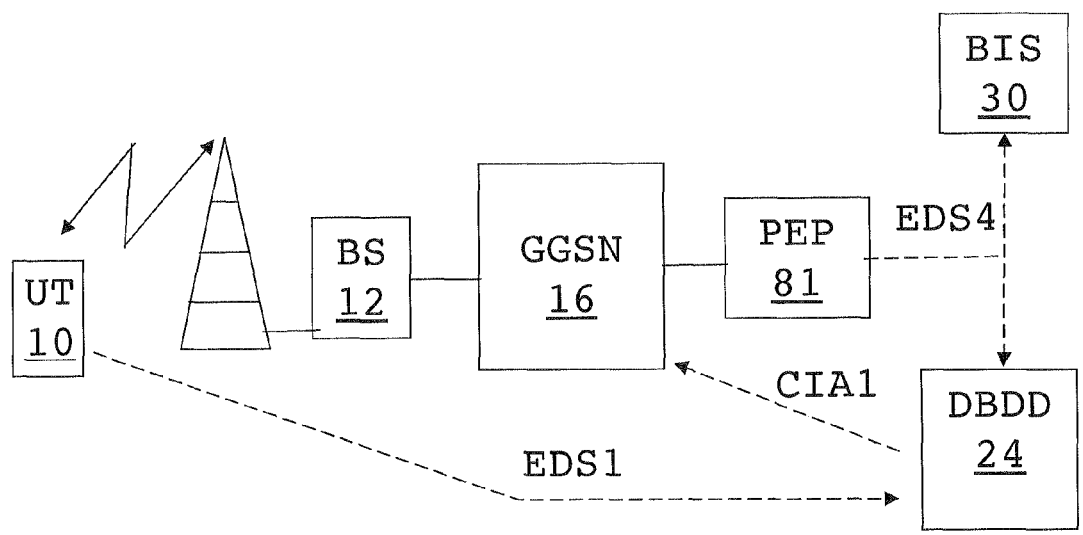
FIG. 9 shows a communication network in which a device for determining deviating behaviour of a user terminal according to a third embodiment of the invention is provided, FIG. 10 schematically shows a computer program product according to an embodiment of the invention in the form of a CD ROM disc, and FIG. 11 schematically outlines a number of functional units in a computer program according to an embodiment of the invention that performs some of the functionality outlined in FIG. 6.

FIG. 9 schematically shows a scenario according to a third embodiment of the invention where such a deviating behaviour determining device 24 only includes a deviating behaviour determining unit and communication interface. Here the first user terminal 10 is, as before, communicating with the first base station 12, which in turn is connected to the GGSN node 16. To this GGSN node 16 there is furthermore connected a PEP (Policy Enforcement Point) unit 81. This PEP unit 81 generates network event data sets in the form of EDRs that are sent to the billing system 29, where the previously described fourth event data set EDS4 is shown as an example of such an event data set. Such an event data set is formed as soon as a communication session is ended. This event data set EDS4 is then also sent to the deviating behaviour determining device 24. The first user terminal 10 is here also arranged to send user terminal related event data sets directly to the deviating behaviour determining device 24 as soon as they have been generated and thus also the previously described first event data set EDS1. As an example the deviating behaviour determining device 24 here directly receives the first event data set EDS1 and the fourth event data set EDS4. If the first event data set is here associated with a messaging session, this means that here the carrier or SMS or MMS information is compared with billing records. These event data sets are then processed in the deviating behaviour determining unit of a deviating behaviour determining device and if a deviating behaviour is determined a change influencing action may be performed such as sending an order CIA1 to the GGSN node 16.

There are several further variations that may be made of the invention. In the above described tables it is possible that a separate user terminal identifier is omitted. The user terminal may then be uniquely identified by either source or destination address, especially if a fixed addressing scheme is used instead of a dynamic addressing scheme. The tables could also be provided in separate data bases or as in the third embodiment omitted completely. The analysis of event data sets for which deviating behaviour has already been determined and the corresponding analysis data base could of course also be omitted. The base stations may be provided with firewalls that stop various type of traffic to and from connected user terminals. The deviating behaviour determining device, the network event data set collection node or the GGSN node may therefore also communicate with these base stations in order to stop traffic in relation to a service. The base stations may also be arranged to provide network generated event data sets such as CDRs. Therefore the network event data set collection node may also communicate with these in order to receive network generated event data sets.

Figure 10:
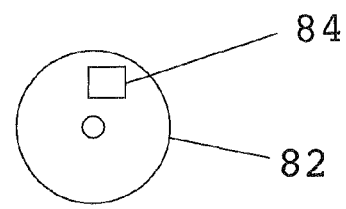

The deviating behaviour determining device may as described earlier with advantage be provided in the form of a processor with associated program memory including computer program code for performing the functionality of the deviating behaviour determining unit as well as of the event data set correlating unit and event data set correlating unit if these latter units were included in the deviating behaviour determining device. It should be realized that this unit or these units may also be provided in the form of hardware, like for instance in the form of an ASIC circuit. The computer program code may also be provided on a computer readable means, for instance in the form of a data carrier, like a CD ROM disc or a memory stick, which will implement the function of the above-described units of the deviating behaviour determining device when being loaded into a server. One such computer program product in the form of a CD ROM disc 82 with a computer program code 84 including such computer program code is schematically shown in FIG. 10.

The program code can also be provided as a pure computer program. One example of this is provided in FIG. 11, which outlines the computer program 84 for the deviating behaviour determining device according to the first embodiment. This computer program 84 includes a computer program module named DEVIATING BEHAVIOUR DETERMINING FUNCTION, which includes computer program instructions INSTR that implement the functionality of the deviating behaviour determining unit depicted in FIG. 3 and a computer program module named EDS CORRELATING FUNCTION, which includes computer program instructions INSTR that implement the functionality of the event data set correlating unit depicted in FIG. 3. A computer program module that provides the event data set modifying unit could as an alternative also be included and the computer program module that implements the event data set correlating unit could be excluded.

The computer program may thus include computer program code means or computer program instructions that when loaded in a device for determining deviating behaviour makes this device obtain the first and second groups of event data sets, perform a comparison involving both groups of event data sets and determine the existence of deviating behaviour of the specific user terminal based on the comparison.

In the determining of the existence of deviating behaviour, the code may furthermore make the device determine a deviating behaviour if the first group of event data sets differ from the second group of event data sets, where the groups may differ if there is a discrepancy between data in an event data set in the first group and a corresponding event data set in the second group. They may also differ through a discrepancy in numbers of event data sets between the first and second group.

The code may furthermore make the device determine a service for the user terminal that is linked to the deviating behaviour and perform a change influencing action for obtaining a change in activities that involve both the specific user terminal and the service.

Here a change influencing action can be notifying a device capable of influencing the deviating behaviour, to enforce restrictions in relation to the service for the user terminal and/or influencing communication sessions in relation to the service involving the specific user terminal.

The code may furthermore make the device map a sequence of tactile user inputs performed via the user terminal to a reference sequence of tactile inputs in order to determine a service in an event data set in the first group.

The code may also make the device receive user terminal generated event data sets from the user terminal, perform the mapping on these event data sets, modify the received event data sets with data identifying determined services and store the modified event data sets in an event data base, where the obtaining of the first group of event data sets involves fetching the first group of event data sets from the event data base.

The code may finally make the device store event data sets for which deviating behaviour has been determined in an analysis data base as well as fetch event data sets from the analysis data base, analyse these event data sets and change the rules for determining deviating behaviour based on the analysis.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the invention is only to be limited by the following claims.

The invention claimed is:

1. A method for determining deviating behaviour of a user terminal being performed in at least one network node of a communication network and comprising the steps of:
   obtaining a first group of event data sets including at least one event data set, where each event data set in this first group includes user terminal generated event data related to events in a specific user terminal,
   obtaining a second group of event data sets including at least one event data set, where each event data set in this second group includes network generated event data related to said specific user terminal,
   storing each event data set in an event data base, wherein each event data set comprises a plurality of characteristics relating to a specific communication session,
   performing a comparison involving the first group of event data sets and the second group of event data sets,
   determining the existence of deviating behaviour of said specific user terminal based on the comparison, wherein one of the event data sets in the second group of event data sets indicates a specific communication session from said specific user terminal for which there is no corresponding event data in the first group of event data sets,
   determining a service for said specific user terminal that is linked to said deviating behavior, and
   performing a change influencing action for obtaining a change in activities that involve both said specific user terminal and said service,
   wherein the plurality of characteristics relating to a specific communication session includes data identifying a service associated with the event, communication session identifying data associated with the event and including at least one communication identifier identifying the user terminal, at least one communication session bearer identifier and time data related to the communication session.

2. The method according to claim 1, wherein the event data sets in the second group are correlated with the event data sets in the first group.

3. The method according to claim 1, wherein the step of determining the existence of deviating behaviour involves determining a deviating behaviour if the first group of event data sets differ from the second group of event data sets.

4. The method according to claim 3, wherein the first group of event data sets differs from the second group of event data sets if there is a discrepancy between data in an event data set in the first group and a corresponding event data set in the second group.

5. The method according to claim 3, wherein there are more than one event data set in at least one of the first and the second groups and the first group of event data sets differ from the second group of event data sets if there is a discrepancy in numbers of event data sets between the first and second group.

6. The method according to claim 5, wherein one of the event data sets in the second group is obtained from a charge record and concerns an electronic message for which there is no event data set in the first group.

7. The method according to claim 1, wherein the step of performing a change influencing action comprises notifying a device capable of influencing the deviating behaviour.

8. The method according to claim 1, wherein the step of performing a change influencing action comprises enforcing restrictions in relation to said service for the user terminal.

9. The method according to claim 8, wherein said service involves one or more communication sessions engaging the specific user terminal via the network and the step of performing a change influencing action comprises influencing communication sessions in relation to said service and involving the specific user terminal.

10. The method according to claim 1, further comprising the step of mapping a sequence of tactile user inputs performed via the user terminal to a reference sequence of tactile inputs in order to determine a service in an event data set in the first group.

11. The method according to claim 10, further comprising the steps of receiving user terminal generated event data sets from the user terminal, performing said step of mapping on these event data sets, modifying the received event data sets with data identifying determined services and storing said modified event data sets in an event data base, wherein the step of obtaining said first group of event data sets involves fetching the first group of event data sets from the event data base.

12. The method according to claim 1, further comprising the step of providing event data sets based on charge records and event records in the network and storing these event data sets in an event data base, wherein the step of obtaining the second group of event data sets involves fetching the second group of event data sets from this event data base before performing the step of comparing.

13. The method according to claim 1, further comprising the step of storing event data sets for which deviating behaviour has been determined in an analysis data base.

14. The method according to claim 13, further comprising the steps of fetching event data sets from the analysis data base, analysing these event data sets and changing the rules for determining deviating behaviour based on said analysis.

15. The method according to claim 1, wherein one of the event data sets in the first group of event data sets was derived from tactile input sequence data (TISD) or contains TISD, wherein the TISD identifies a tactile input sequence.

16. The method according to claim 1, wherein said network generated data is generated and stored at a network node other than said specific user terminal in response to at least one communication from said specific user terminal.

17. The method according to claim 1, wherein said network generated event data is based on least one of automatically logged call detail records and charge records.

18. The method according to claim 1, wherein said specific communication session is a Short Message Service (SMS) or Multimedia Message Service (MMS) message.

19. The method according to claim 1, wherein said specific communication session contains at least part of a user phonebook.

20. The method according to claim 1, wherein said specific communication session is a phone call.

21. A device in a network node of a communication network for determining deviating behaviour of a user terminal and comprising:
- at least one communication interface for communicating with other devices related to the communication network, and
- a deviating behaviour determining unit, comprising a processor and associated program code, configured to:
- obtain a first group of event data sets including at least one event data set and where each event data set in this first group includes user terminal generated event data related to events in a specific user terminal,
- obtain a second group of event data sets including at least one event data set and where each event data set in this second group includes network generated event data related to said specific user terminal,
- store each event data set in an event data base, wherein each event data set comprises a plurality of characteristics relating to a specific communication session,
- perform a comparison involving the first group of event data sets and the second group of event data sets,
- determine the existence of deviating behaviour of said specific user terminal based on the comparison, wherein one of the event data sets in the second group of event data sets indicates a specific communication session from said specific user terminal for which there is no corresponding event data in the first group of event data sets,
- determine a service for the user terminal that is linked to said deviating behaviour, and
- perform a change influencing action for obtaining a change in activities that involve both said specific user terminal and said service,
- wherein the plurality of characteristics relating to a specific communication session includes data identifying a service associated with the event, communication session identifying data associated with the event and including at least one communication identifier identifying the user terminal, at least one communication session bearer identifier and time data related to the communication session.

22. The device according to claim 21, further comprising an event data set correlating unit, comprising a processor and associated program code, arranged to determine which event data sets belong to the first group and which event data sets belong to the second group at least based on that fact that they are associated with the same service.

23. The device according to claim 22, further comprising an event data set modifying unit, comprising a processor and associated program code, arranged to map a sequence of tactile inputs performed on the user terminal to a reference sequence of tactile inputs in order to determine a service in an event data set in the first group.

24. A computer program product comprising a computer program for determining deviating behaviour of a user terminal in a communication network and a non-transitory computer readable medium on which the computer program is stored, the computer program comprising computer program code which when run on a device causes said device to:
- obtain a first group of event data sets including at least one event data set and where each event data set in this first group includes user terminal generated event data related to events in a specific user terminal,
- obtain a second group of event data sets including at least one event data set and where each event data set in this second group includes network generated event data related to said specific user terminal,
- store each event data set in an event data base, wherein each event data set comprises a plurality of characteristics relating to a specific communication session,
- perform a comparison involving the first group of event data sets and the second group of event data sets,
- determine the existence of deviating behaviour of said specific user terminal based on the comparison,
  - wherein one of the event data sets in the second group of event data sets indicates a specific communication session from said specific user terminal for which there is no corresponding event data in the first group of event data sets,
- determine a service for said user terminal that is linked to said deviating behavior, and
- perform a change influencing action for obtaining a change in activities that involve both said specific user terminal and said service,
- wherein the plurality of characteristics relating to a specific communication session includes data identifying a service associated with the event, communication session identifying data associated with the event and including at least one communication identifier identifying the user terminal, at least one communication session bearer identifier and time data related to the communication session.

* * * * *

UNITED STATES PATENT AND TRADEMARK OFFICE
CERTIFICATE OF CORRECTION

PATENT NO.       : 8,918,876 B2
APPLICATION NO.  : 13/266790
DATED            : December 23, 2014
INVENTOR(S)      : Larsson et al.

It is certified that error appears in the above-identified patent and that said Letters Patent is hereby corrected as shown below:

Title page, item (75), under "Inventors", in Column 1, Line 1, delete "Upplands Vasby" and insert -- Upplands Väsby --, therefor.

Title page, item (75), under "Inventors", in Column 1, Line 2, delete "(DE);" and insert -- (SE); --, therefor.

Title page, item (75), under "Inventors", in Column 1, Line 3, delete "Hagersten" and insert -- Hägersten --, therefor.

Specification

In Column 1, Line 24, delete "Interface)" and insert -- Interfaces) --, therefor.

In Column 5, Line 51, delete "there" and insert -- their --, therefor.

In Column 6, Line 59, delete "Record)." and insert -- Records). --, therefor.

In Column 10, Line 37, delete "FIG. 1-5" and insert -- FIGS. 1-5 --, therefor.

In Column 15, Line 51, delete "system" and insert -- system. --, therefor.

In Column 15, Line 56, delete "input" and insert -- input. --, therefor.

In Column 16, Line 24, delete "a a" and insert -- a --, therefor.

Signed and Sealed this
Twenty-seventh Day of October, 2015

Michelle K. Lee
*Director of the United States Patent and Trademark Office*